United States Patent [19]

Cleary

[11] 4,279,553
[45] Jul. 21, 1981

[54] MACHINE TOOL COLUMN MOUNT

[75] Inventor: John P. Cleary, Valley Cottage, N.Y.

[73] Assignee: Ralph A. Heineman, New York, N.Y.

[21] Appl. No.: 19,169

[22] Filed: Mar. 9, 1979

[51] Int. Cl.³ .............................................. B23B 39/00
[52] U.S. Cl. ..................................... 408/135; 74/109;
100/288; 254/95; 267/59
[58] Field of Search ................... 408/135, 76; 254/95;
267/59, 62; 100/288; 101/35 P; 29/750, 751,
752, 753, 758; 74/32, 89.12, 109

[56] References Cited

U.S. PATENT DOCUMENTS

| 79,778 | 7/1868 | Roff | 267/59 |
|---|---|---|---|
| 1,047,936 | 12/1912 | Hare | 408/135 X |
| 1,618,358 | 2/1927 | Thompson | 408/135 X |
| 3,456,738 | 7/1969 | Harry | 408/76 X |
| 3,583,743 | 6/1971 | Newell | 254/95 X |

*Primary Examiner*—Z. R. Bilinsky
*Attorney, Agent, or Firm*—Philip H. Gottfried

[57] ABSTRACT

A column mount is provided which is particularly useful in a machine tool capable of being assembled to perform either horizontal or vertical machining operations. The mount includes an adjustably movable support member for reciprocating a tool bit head assembly over a given length along a column, the column extending vertically from the machining tool when performing vertical machining operations. The mount operates to allow the head assembly support member to be adjustably reciprocated from a selected starting position on the column above a workpiece, and enables the support member to be readily moved along the column to the desired position.

4 Claims, 9 Drawing Figures

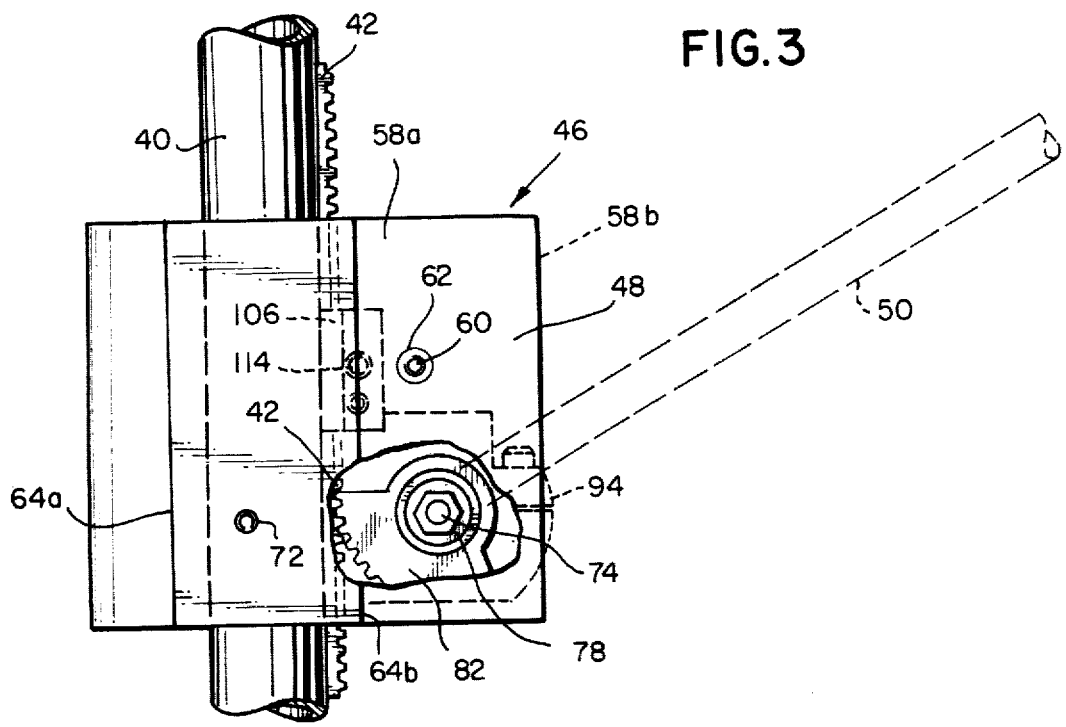
FIG. 3
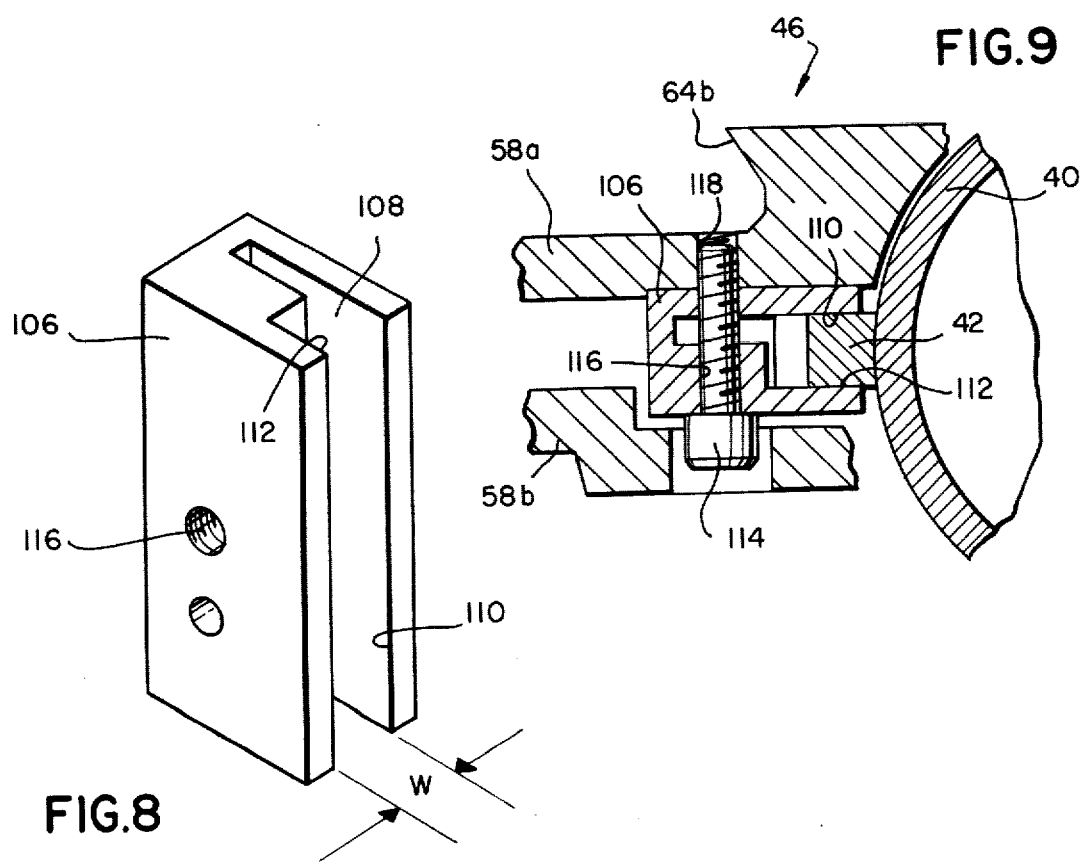
FIG. 9
FIG. 8

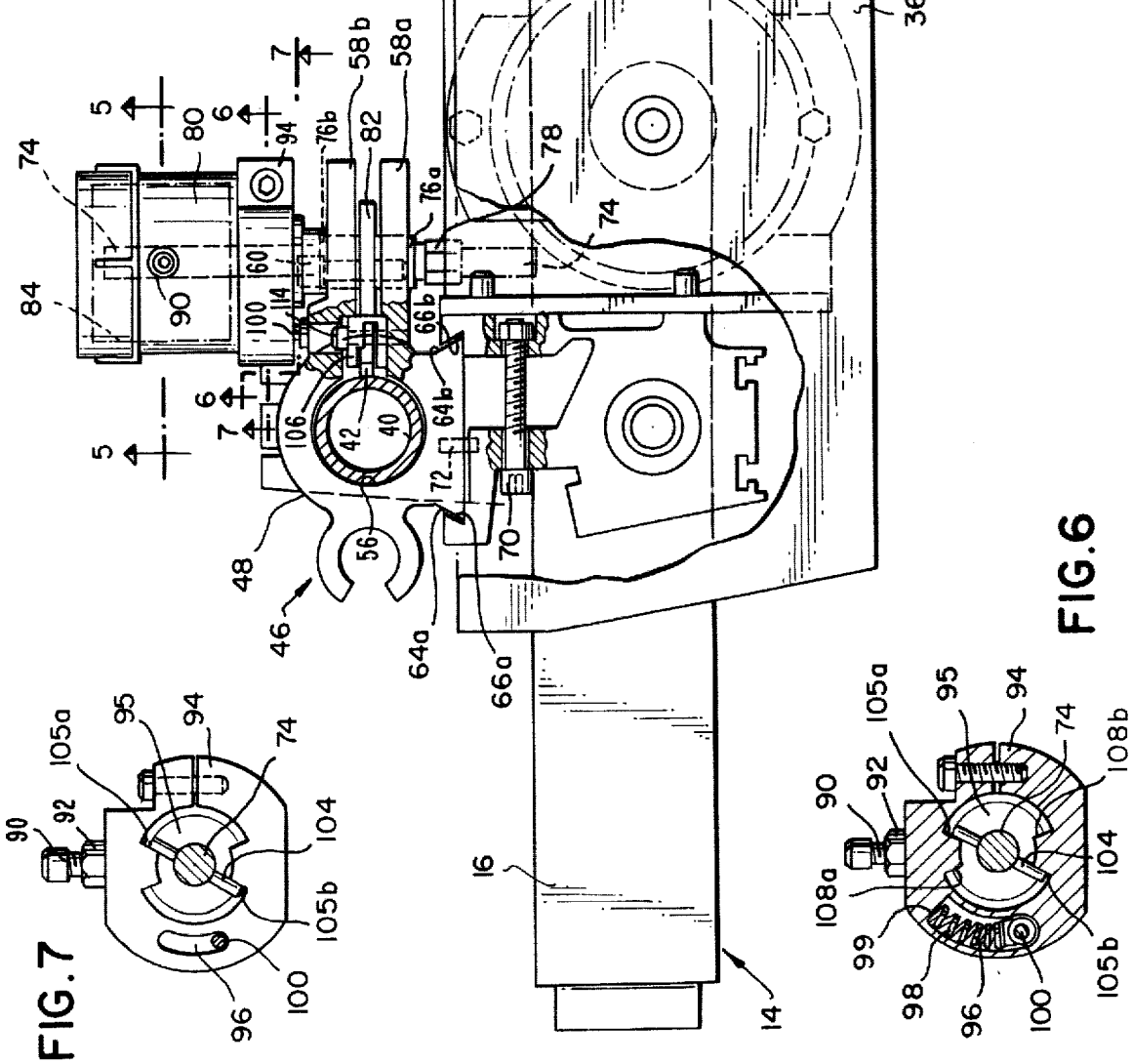

MACHINE TOOL COLUMN MOUNT

The present invention relates generally to vertical column mounts for machine tools, and more particularly to a column mount assembly which can be used with machine tools capable of being set up to perform either horizontal or vertical machining operations.

Vertical machining operations such as drilling, for example, require that a drill bit be vertically lowered onto and driven through a workpiece with considerable precision over a given range of movement, as the drill bit is rotatably driven by a head assembly mounted on a vertical column. This vertical movement is often manually controlled by way of a hand lever coupled to a gear mechanism within the head assembly.

For example, a known drilling machine includes a rack gear longitudinally fixed to its vertical column. The drill bit head assembly includes a pivotally mounted pinion gear for engaging the column rack gear. A hand lever connected to the pinion gear shaft imparts vertical movement to the head assembly and to a drill bit secured in the assembly chuck.

The above arrangement has the drawback, however, of effectively limiting the operative range of vertical movement of the head assembly to whatever length can be traversed in response to a single stroke of the hand lever by the machine operator. Since it becomes awkward for the operator to move the lever over more than about 180 degrees through a given stroke, workpieces having heights of greatly varying scope cannot be easily accommodated unless the initial vertical clearance between the drill bit and the workpiece can be set to enable all machining to be performed within the range of a single lever stroke. A known construction which allows for an adjustable initial clearance includes a workpiece support table which is movable relative to the column, either by way of a clamp which can be loosened to allow the table to slide to a desired vertical position along the column before the clamp is retightened, or by means of a separate rack gear formed on or fixed to the column which engages a corresponding pinion gear mounted within the workpiece table.

Other known vertical machining tools have a head assembly which itself is clamped at a desired position along the machine column, and further include a tool bit driving spindle mounted within the head assembly which is adjustably movable over a given vertical distance by way of a rack and pinion gear mechanism. Of course, it will be appreciated that this arrangement presents a danger in that loosening of the head assembly clamp may allow the entire assembly to freely fall, thereby damaging both the workpiece and the tool bit, and possibly injuring the operator as well. Similarly, in vertical machining tools having a workpiece table clamped about the machine column, a danger also exists in that loosening of the table clamp may allow both the table and workpiece to fall unless the table is manually supported by the operator.

Another known mount for securing a conventional hand drill to a column for vertical movement relative to a workpiece comprises a pantograph type of structure connected between the hand drill and the column. The drill is then moved up and down by an operator to guide the drill bit relative to the workpiece. Other constructions include various linkages connected between the column and the hand drill and, as with the pantograph type of mount, require an operator to grip the hand drill to guide the drill bit through the workpiece. Accordingly, precision-type work is difficult to implement with these arrangements since no accurate control over the depth of drilling is provided once the drill bit enters the workpiece. Also, the bit may drift from its initial alignment when it travels through the workpiece, as the hand drill may tend to rotate about the axis of the column when downward pressure is exerted thereon.

It is an object of the present invention to overcome the above and other shortcomings in prior machine tool column mounts.

It is another object of the present invention to provide a machine tool column mount which can be readily brought to an initial starting position relative to a workpiece without danger of inflicting damage to a tool bit or to the workpiece.

It is still another object of the present invention to provide a machine tool column mount which can be brought to an initial starting position above the workpiece and then can be adjustably reciprocally moved over a given vertical distance by means of a single lever actuated gear mechanism.

It is still another object of the present invention to provide a machine tool column mount including a gear mechanism which operates to allow the mount to be initially positioned relative to the workpiece and to maintain substantially that position in the event the machine operator releases control of the mount.

It is yet another object of the present invention to provide a machine tool column mount having a single lever actuated gear mechanism including a flat ribbon spiral spring which develops a relatively low degree of friction as it is wound and unwound to transmit a counter moment to the lever.

It is a still further object of the present invention to provide a machine tool column mount wherein rotation of the mount about the axis of its column is restrained so that a machine tool bit will stay in alignment as it travels through the workpiece.

It is yet another object of the present invention to provide a machine tool column mount which can be selectively set to be securely tightened about the column at a desired position thereon to enable certain vertical machining operations to be performed, or to smoothly slide along the column over a given distance without rotating about the column to enable other vertical machining operations to be performed.

In accordance with an illustrative embodiment demonstrating objects and features of the present invention, there is provided in a machine tool having a vertical column for supporting a tool bit head assembly at a desired position above a workpiece, and a rack gear raised from the column and longitudinally aligned therewith, the improvement comprising a support member mountable on the column for reciprocably supporting the head assembly on the column, and actuable gear means mounted to the support member wherein the support member is adjustably movable relative to the workpiece when the gear means is in a first state, and the support member is freely locatable on the column when the gear means is in a second state.

In a preferred embodiment, a cylindrical spring retainer housing is mounted to the support member in axial alignment with a shaft from the gear means which extends through the support member. A flat ribbon spiral spring for developing a return bias moment on the shaft is located within the housing concentrically about at least a portion of the shaft, the inner end of the spring engaging the shaft and the outer end of the spring engaging the housing. A spring locating means within the housing maintains the spring concentric about the shaft when the spring is would within the housing, thereby reducing frictional forces developed between adjacent spring surfaces and enabling the support member to be adjustably moved along the column with minimal effort.

Further, an elongated rack gear of particular width extends longitudinally along the outer surface of the column and is raised a given distance therefrom. A guide member fixedly mounted to the support member has a keyway therein for receiving the rack on the column. The sides of the keyway are formed to closely confront corresponding sides of the rack, thereby restraining rotational movement of the support member about the axis of the column while allowing it to move smoothly over the length of the column.

The above description, as well as further objects, features and advantages of the present invention will be more fully understood by reference to the following detailed description of the presently preferred, but nonetheless illustrative embodiment in accordance with the present invention, when taken in conjunction with the accompanying drawing, wherein:

FIG. 3 is a fragmentary left side elevational view of the column mount, with parts broken away, showing a pinion gear mounted thereon to engage a rack gear on the machine tool column, and a guide member for preventing rotation of the mount about the column;

FIG. 4 is a top plan view of the machine tool as arranged in FIG. 2, with parts broken away, showing the column mount supporting a tool bit head assembly for movement along the column;

FIG. 5 is a cross-sectional elevation view, taken substantially along line 5—5 of FIG. 4 and looking in the direction of the arrows, of a flat ribbon spiral spring within a spring retainer housing associated with the column mount;

FIG. 6 is a cross-sectional elevational view, taken substantially along line 6—6 of FIG. 4 and looking in the direction of the arrows, of a block member clamped about the spring retainer housing and showing another spring within the block member;

FIG. 7 is an elevational, partial cross-sectional view, taken substantially along line 7—7 of FIG. 4 and looking in the direction of the arrows, of the block member;

FIG. 8 is an enlarged perspective view of the guide member showing a keyway therein for receiving the column rack; and, FIG. 9 is a top fragmentary cross-sectional detail view of the guide member in place on the column mount and showing means for adjusting the keyway.

Figure 1:
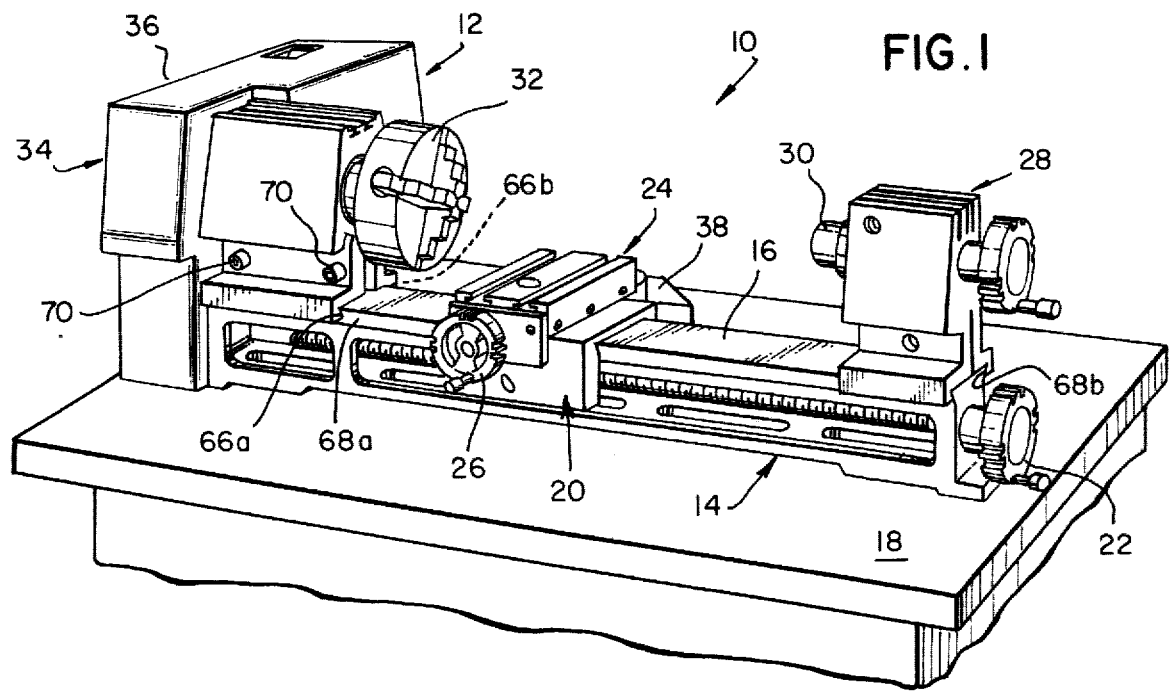
FIG. 1 is a front perspective view of a machine tool having a detachably mountable head assembly, showing the head assembly mounted to enable the machine tool to perform horizontal machining operations.

Referring now specifically to the drawing, and initially to FIG. 1 thereof, in accordance with an illustrative embodiment demonstrating objects and features of the present invention, there is provided a machine tool generally designated by the reference numeral 10, the machine tool 10 having a detachably mountable head assembly 12 at one end thereof to enable the machine tool to perform horizontal machining operations.

Machine tool 10 also includes an elongated machine bed 14 having a planar carriage surface 16 which extends substantially parallel to a work table surface 18. A carriage 20 is mounted for adjustable sliding movement longitudinally over the carriage surface 16 in response to rotation of a handwheel 22 at one end of the machine bed 14. In addition, a carriage cross slide 24 is mounted for lateral sliding movement over the carriage surface in response to rotation of another handwheel 26 at the front end of the cross slide 24.

As shown in FIG. 1, a tail stock 28 including a handwheel driven ram 30 is mounted at the opposite end of the machine tool 10, the ram 30 axially confronting a rotatably driven chuck 32 extending from the head assembly 12 over the carriage surface 16. Head assembly 12 includes a motor drive unit 34 protectively enclosed within a housing 36 for driving a spindle (not shown) which transmits rotational movement to the chuck 32. To facilitate vertical machining operations, the machine tool 10 of FIG. 1 includes a column clamp 38 formed at the rear of the machine bed 14 for firmly securing the base of a vertical column which supports the head assembly 12 above the machine bed 14, as shown in FIG. 2.

Figure 2:
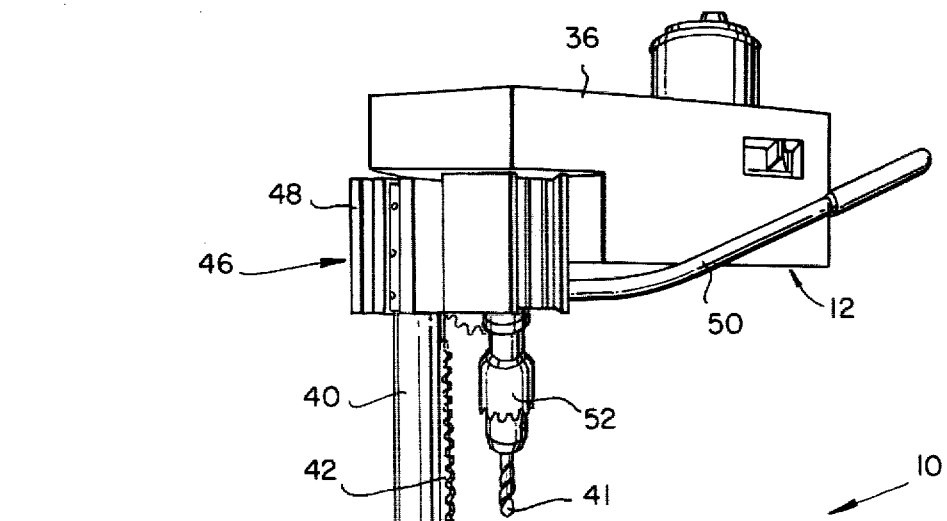
FIG. 2 is a front perspective view of the machine tool of FIG. 1 with the head assembly mounted for vertical machining operations on a column mount for supporting the head assembly, in accordance with the present invention.

Referring now to FIG. 2, both the head assembly 12 and the tail stock 28 of FIG. 1 are removed from their respective mounting locations at the ends of the machine bed 14, and the head assembly 12 is shown supported above the machine bed 14 by way of a generally cylindrical column 40 which extends vertically from the rear machine bed clamp 38.

When set up in this manner, the tool 10 can perform well known vertical machining operations such as drilling which require the head assembly 12 to accurately guide a drill bit 41 vertically through a workpiece (not shown) supported on the machine bed 14. The tool 10 can also perform other vertical machining operations such as milling which require the head assembly 12 to be firmly secured at a desired position above the workpiece, as will be explained hereinafter.

The column 40 has a rack gear 42 fixed thereto, of a given width, extending longitudinally along its outer surface. The gear 42 projects a given radial distance from the column surface, as shown best in FIG. 3. A workpiece vise 44 (FIG. 2) is pivotally mounted atop the cross slide 24. This construction and arrangement allows a workpiece clamped in the vise 44 to be precisely moved to a desired horizontal position beneath the head assembly 12, prior to the vertical machining to be performed on the workpiece.

A column mount, generally designated by the reference numeral 46, includes a support member 48 for supporting the head assembly 12 thereon, and a hand lever 50 for allowing an operator to adjustably move the column mount 46 to a desired vertical location along the length of the column 40. The vertically mounted head assembly 12 also includes a bit chuck 52 which may differ physically from the chuck 32 in FIG. 1, but which is also rotatably driven by the spindle within the head assembly 12. Accordingly, as chuck 52 rotatably drives the drill bit 41 shown secured therein, the entire head assembly 12 can be moved vertically by the column mount 46 in response to rotation of the hand lever 50.

Further details of the column mount 46 will now be described with reference to FIGS. 3 and 4. Support member 48 is formed to have a generally cylindrical bore 56 extending therethrough for closely surrounding the column 40 (FIG. 4). The member 48 includes a pair of substantially parallel, spaced apart flanges 58a, 58b arranged to extend laterally of the column 40. The spacing between the flanges and, hence, the tightness of fit of the support member about the column 40, is adjustable by rotation of a screw 60 which extends through flange 58b and engages a threaded bushing 62 tightly fitted in a opening provided in flange 58a. Flanges 58a, 58b are each arranged to be substantially parallel to and on opposite sides of a plane extending through the rack gear 42 and the axis of column 40, as shown in FIG. 4. Ample clearance is provided between the flanges 58a, 58b and the rack gear 42 so that they do not interfere with each other during movement of the support member 48 along the column 40. Accordingly, in the event it is desired to tightly clamp the support member 48 about the column to maintain the head assembly at a desired position above the workpiece, the screw 60 is tightened, thereby urging flanges 58a, 58b together so as to constrict the bore 56 a sufficient amount about the column 40 to accomplish such clamping.

Support member 48 also includes a pair of parallel, spaced apart dovetail ways 64a, 64b which engage corresponding dovetail edges 66a, 66b, respectively, on the head assembly 12 when the assembly is mounted to the column mount 46 for vertical machining operations. When the head assembly 12 is mounted at one end of the machine tool bed 14 for horizontal machining operations, as shown in FIG. 1, dovetail edges 66a, 66b engage corresponding dovetail ways 68a, 68b formed along the edges of the carriage surface 16 on the bed 14. A pair of screws 70, also shown in FIG. 1, extend through the base of the head assembly 12 and operate to clamp the edges 66a, 66b tightly against the support member ways 64a, 64b so that the assembly 12 can be firmly held in place on the support member. Referring again to FIG. 4, a stop pin 72 extends from the support member 48 to limit the downward travel of the head assembly 12 when it is placed on the support member 48 and before the clamping screws 70 are tightened.

Handle 50 is coupled to a gear shaft 74 which extends through both of the flanges 58a, 58b. The shaft 74 rotates within axially aligned bushings 76a, 76b, both of which are tightly fitted in openings provided in the flanges 58a, 58b, respectively. Shaft 74 has a hexagonal collar 78 formed about its front end for mating with a corresponding hexagonal socket (not shown) formed within one end of the handle 50. A portion of the shaft 74 extends axially within a generally cylindrical spring retainer housing 80 at the rear of the column mount 46.

A sector of a pinion gear 82, having teeth of such dimensions to properly mate with the teeth of the column rack 42, is joined to the gear shaft 74 between the support member flanges 58a, 58b, for rotational movement in response to rotation of the handle 50. As shown in FIG. 3, in the preferred embodiment the pinion gear teeth extend over an arc of about 120 degrees although other degrees of extension thereof are possible. In accordance with this construction, it will be understood that the support member 48 can be adjustably moved along the column 40 to a desired position as the handle 50 is rotated, provided the pinion gear 82 is in a state where its teeth engage those of the column rack 42.

In the event the handle 50 is rotated further upward than shown in FIG. 3, so that the pinion gear 82 is in a state where its teeth are disengaged from those of the rack 42, it will be apparent that the support member 48 becomes freely slidable along the column 40. This allows the entire head assembly 12 including the drill bit 41 to be brought to a desired initial starting position above the workpiece supported on the machine bed 14. From this starting position, the drill bit 41 can then be smoothly and precisely lowered against and through the workpiece as the handle 50 is rotated, as long as the pinion gear 82 has been brought back into engagement with the column rack 42.

Referring now to FIG. 5, a spirally wound flat ribbon spring 84 is axially aligned within the retainer housing 80. The spring 84 operates to provide a return bias moment to the pinion gear shaft 74 as the handle 50 is moved to rotate the shaft to raise or lower the column mount. The spring 84 has its inner end 86 formed to engage a corresponding slot provided in the end of the pinion gear shaft 74. The outer end of the spring 84 is formed in a reverse curve loop to fixedly engage a slot 88 formed longitudinally along the inner wall and parallel to the axis of the retainer housing 80. A jam screw 90 extends through a threaded opening in the wall of the housing 80 which is located about 180 degrees opposite the slot 88. The screw 90 projects radially inwardly against the outer surface of the spring 84. Screw 90 is adjusted to extend a sufficient distance within the housing 80 to maintain the spring 84 substantially concentric about the axis of shaft 74 as the shaft is rotated and the spring is wound or unwound thereabout. A jam nut 92 is then tightened against the housing 80 to maintain the screw 90 in this position. In place of the screw 90 and nut 92, a fixed projection of proper length can be provided from the inner wall of the housing 80 to abut the spring 84, and maintain the spring concentric about the shaft 74.

This last-described feature of the present invention substantially eliminates friction which would otherwise develop between adjacent surfaces of the ribbon spring 84 as it winds or unwinds within the housing 80 while the column mount 46 is lowered or raised, respectively. This reduction in friction thus allows less effort to be expended in swinging the mount handle 50, and provides the operator with a greater sensitivity to forces exerted on the column mount and the tool bit therein.

A block member 94 is securely clamped about the front end of the retainer housing 80. As shown in FIGS. 6 and 7, the block member 94 has an opening 95 extending centrally therethrough which is sized to allow passage of the pinion gear shaft 74, and an arcuately formed slotted opening 96 therein. A coil spring 98 is seated within the opening 96 so as to extend arcuately about the axis of the pinion gear shaft 74 (FIG. 6). One end of the spring 98 abuts one end of the opening as at 99, and the other end of the spring engages a stud 100 which fixedly extends from the rear of the support flanges 58b (FIG. 4) and through the opening 96 (FIG. 7). A pin 104 is provided through the pinion gear shaft 74 so as to abut radially extending walls within the central opening 95 at extreme rotational positions of the shaft 74, these positions corresponding to the limits of engagement of the pinion gear 82 with the rack 42.

In FIGS. 6 and 7, the position of the pinion gear shaft 74 corresponds to the uppermost position of the handle 50 at which the pinion gear teeth engage the column rack 42, the shaft pin 104 abutting walls 105a, 105b within the central clamping block opening 95. As the handle 50 is swung or rotated down from this position, the support member 48 is lowered along the column 40 until the pinion gear shaft 74 is at a rotational position where the shaft pin 104 abuts radially extending walls 108a, 108b within the central opening 95. Further rotation of the shaft 74 beyond this position is thereby restrained.

An important feature of the present invention is the ability of the column mount 46 to be freely slidable to a desired starting position along the length of the column 40 from which it can be adjustably reciprocated by way of the handle 50. Referring to FIG. 3, this movement is enabled by swinging the handle 50 further upward than shown therein, to a position where the pinion gear teeth are brought out of mesh with the column rack 42. The support member 48 can then be moved over the length of the column 40 by an appropriate force exerted manually by the user.

In order to prevent the support member 48, with the entire head assembly thereon, from inadvertently falling toward a workpiece when the pinion gear 82 is in the unmeshed state and the handle 50 is released, the block member spring 98 operates to urge the pinion gear toward its engaged state so as to check such falling movement, as will now be explained.

When the handle 50 is swung upwardly to bring the pinion gear 82 into its unmeshed state, the shaft pin 104 abuts the radially extending walls 105a, 105b within the block member opening 95, and causes the member to rotate counter-clockwise as viewed in FIGS. 6 and 7. Spring 98 is compressed between end wall 99 (FIG. 6) of the slot 96, and the stud 100 fixedly extending from the rear of support member flange 58b. When the spring 98 is fully compressed, further rotation of the member 94 and, hence, of the handle 50, is restrained. It will be understood that if both the support member 48 and handle 50 are now released, the spring 98 will urge the member 94 clockwise, thereby rotating the gear shaft 74 in the same direction to turn the pinion gear 82 toward its meshed state. Further free downward movement of the column mount 46 is prevented by the ribbon spring 84 which provides a counter-clockwise restraining moment to the gear shaft 74, once the pinion gear 82 has meshed with the rack 42.

During normal operation, swinging handle 50 downward rotates the pinion gear shaft 74 clockwise as viewed in FIG. 6. Like rotation of the block member 94 is prevented by the stud 100 which is then in abutment with the lower end wall of the slotted opening 96. Since the spring retainer housing 80 is securely clamped to the block member, it also is restrained from rotating clockwise, so that the ribbon spring 84 is wound within the housing 80 by the gear shaft 74. This causes an increasing counter moment to be transmitted to the handle 50 as it is swung toward its lowermost position.

Another important feature of the present invention is the provision of a guide member 106 which is fixedly mounted to the support member 48 against one of the flanges 58a, as shown in FIGS. 3, 4, 8 and 9. Guide member 106 is formed of a relatively soft metal such as brass and has an elongated keyway 108 formed therein for receiving a portion of the rack gear 42 when the support member 48 is mounted on the column 40. The width W of the keyway (FIG. 8) is determined so that its sides 110, 112 will closely confront corresponding sides of the rack 42, respectively. As shown in FIG. 9, a screw 114 passes through an opening 116 in the guide member to engage a threaded opening 118 in support member flange 58a. Screw 114 can be adjusted so as to selectively bring the sides 110, 112 of the member into smooth sliding engagement with the rack, or to cause the members to tightly clamp the rack, as desired.

By this construction, it will be appreciated that the column mount 46 is restrained from rotational movement about the axis of the column 40, owing to the engagement of the keyway 108 in the guide member with the column rack 42. In addition, the column mount can be locked at a desired position above a workpiece by merely bringing the mount to the desired position and tightening the screw 114 to clamp the guide member on the rack. However, it is preferred that the support member 48 itself be clamped to the column by way of the screw 60 through its flanges 58a, 58b, when it is to be maintained at a given height above the workpiece, instead of clamping the guide member 106 to the rack. Thus, the guide member will always be properly set to provide smooth sliding movement to the support member 48 along the column without rotation about the column axis, regardless of the amount screw 60 is loosened to allow the support member to slide. It will also be appreciated that the guide member 106 develops little or no friction between it and the rack, due to use of a relatively soft metal such as brass for the member 106.

As will be readily apparent to those skilled in the art, the present invention may be realized in other specific forms without departing from its spirit or essential characteristics. For example, the column mount 46 of the present invention may be used in conjunction with machine tools having overall configurations which differ from that of the machine tool 10 shown in FIG. 1. Such other machine tools may include, for example, those which have a workpiece support platform and head assembly both mounted on a vertical column which extends up from a floor.

The present embodiment is, therefore, to be considered as illustrative and not restrictive, the scope of the invention being indicated by the claims rather than by the foregoing description, and all changes which come within the meaning and range of equivalents of the claims are therefore intended to be embraced therein.

What is claimed is:

1. In a machine tool of the type including a vertical column for supporting a tool bit head assembly at a particular position relative to a workpiece, said column having an elongated rack gear fixed thereto in longitudinal alignment therewith, the improvement comprising a support member mounted for sliding movement along said column for reciprocally supporting said head assembly on said column, actuable gear means mounted to said support member wherein said support member is adjustably movable relative to said workpiece when said gear means is in a first state, and said support member is freely locatable on said column at a desired starting position relative to said workpiece when said gear means is in a second state, said gear means including a pinion gear having teeth extending therefrom over at least a partially circular arc, said pinion gear being pivotally mounted to said support member by an axial shaft extending through said support member for rotational movement relative thereto, said pinion gear and said rack gear being constructed and arranged so that said pinion gear engages said rack gear when said pinion gear is rotated within a given range of rotational positions corresponding to said first state, and said pinion gear disengages said rack gear when said pinion gear is rotated within another given range of rotational positions corresponding to said second state, and means for urging said pinion gear toward said first state, said urging means including a block member surrounding said shaft and adapted to be rotated therewith relative to said support member when said pinion gear is rotated within said other range of rotational positions, said block member having a recess therein extending arcuately about said shaft, spring extending within said recess so that one end thereof confronts a corresponding end of said recess, and a stud fixedly extending from said support member to engage the other end of said spring so that said spring is deformed when said shaft rotates said pinion gear within said other range.

2. In a machine tool of the type including a vertical column for supporting a tool bit head assembly at a particular position relative to a workpiece, said column having an elongated rack gear fixed thereto in longitudinal alignment therewith, the improvement comprising a support member mounted for sliding movement along said column for reciprocally supporting said head assembly on said column, a pinion gear pivotally mounted to said support member by a shaft extending through said support member for rotational movement relative thereto, wherein said support member is adjustably movable relative to said workpiece when said gear is in one range of rotational positions, and said support member is freely locatable on said column at a desired starting position relative to said workpiece when said gear is in another range of rotational positions, and means for urging said pinion gear toward said one range of rotational positions, said urging means including a block member surrounding said shaft and adapted to be rotated therewith relative to said support member when said pinion gear is rotated within said other range of rotational positions, said block member having a recess therein extending arcuately about said shaft, a spring extending within said recess so that one end thereof confronts a corresponding end of said recess, and a stud fixedly extending from said support member to engage the other end of said spring so that said spring is deformed when said shaft rotates said pinion gear within said other range.

3. In a machine tool including a gear mechanism for adjustably moving a support member over a given distance along a column, said mechanism including a gear mounted to said support member and a shaft extending axially through said gear, the improvement comprising a spring retainer housing having an inner wall surrounding said gear shaft and having an axis, a flat ribbon spiral spring within said housing concentrically surrounding at least a portion of said gear shaft for developing a counter moment on said shaft, the inner end of said spring engaging said shaft and the outer end of said spring engaging said housing on said inner wall thereof along a path substantially parallel to said axis of said housing, and spring locating means projecting radially inward within said housing to abut against the outer surface of said spring for maintaining said spring substantially concentric about said shaft when said shaft is rotated and said spring is wound within said housing, said spring locating means extending from a location on said inner wall which is about 180 degrees opposite said path, wherein frictional forces developed between adjacent surfaces of said spring are substantially reduced when said gear mechanism is operated.

4. The column mount of claim 3, wherein said housing has a threaded opening therein coincident with said location and said spring locating means comprises a screw threadably engaging said opening to project an adjustable distance from said inner wall against the outer surface of said spring.

* * * * *